(12) United States Patent
Carragher et al.

(10) Patent No.: US 11,536,111 B2
(45) Date of Patent: Dec. 27, 2022

(54) DOWNHOLE TOOL DEPLOYMENT ASSEMBLY WITH IMPROVED HEATER REMOVABILITY AND METHODS OF EMPLOYING SUCH

(71) Applicant: BiSN Tec Ltd, Cheshire (GB)

(72) Inventors: Paul Carragher, Lymm (GB); Lance Underwood, Cypress, TX (US)

(73) Assignee: BiSN Tec. Ltd., Warrington (GB)

( * ) Notice: Subject to any disclaimer, the term of this patent is extended or adjusted under 35 U.S.C. 154(b) by 72 days.

(21) Appl. No.: 16/616,456

(22) PCT Filed: May 24, 2018

(86) PCT No.: PCT/GB2018/051425
§ 371 (c)(1),
(2) Date: Nov. 23, 2019

(87) PCT Pub. No.: WO2018/215786
PCT Pub. Date: Nov. 29, 2018

(65) Prior Publication Data
US 2020/0173250 A1 Jun. 4, 2020
US 2021/0164321 A9 Jun. 3, 2021

Related U.S. Application Data

(63) Continuation-in-part of application No. 16/304,251, filed as application No. PCT/GB2017/051458 on May 24, 2017.

(30) Foreign Application Priority Data

May 24, 2016 (GB) .................................. 1609137.3
Aug. 19, 2016 (GB) .................................. 1614227.5
Aug. 23, 2017 (GB) .................................. 1713517.9

(51) Int. Cl.
*E21B 33/13* (2006.01)
*E21B 36/00* (2006.01)
*E21B 33/134* (2006.01)

(52) U.S. Cl.
CPC ............ *E21B 33/13* (2013.01); *E21B 33/134* (2013.01); *E21B 36/00* (2013.01); *E21B 36/008* (2013.01)

(58) Field of Classification Search
CPC ...... E21B 36/008; E21B 33/13; E21B 33/134; E21B 36/00
See application file for complete search history.

(56) References Cited

U.S. PATENT DOCUMENTS 1,534,229 A 4/1925 Livergood
2,076,308 A 4/1937 Wells
(Continued)

FOREIGN PATENT DOCUMENTS

CA 2592556 6/2007
EP 1 933 004 6/2008
(Continued)

OTHER PUBLICATIONS

U.S. Appl. No. 16/095,928, filed Oct. 23, 2018, Carragher.
(Continued)

*Primary Examiner* — Taras P Bemko

(57) ABSTRACT

The present invention provides a downhole tool deployment assembly (1) for use in particular in oil/gas wells. The assembly comprises a heater (2) with a tubular heater body having an internal cavity configured to receive a heat source (6). The assembly also has a tubular heat conducting member (3) configured to surround the tubular heater body leaving an annular clearance, wherein the tubular heat conducting member does not extend along the entire length of the tubular heater body. In addition, a collar (4) is
(Continued)

mounted adjacent to the region of the assembly where the tubular heat conducting member ends. The collar is configured to prevent access to the annular clearance between the tubular heat conducting member and the tubular heater body. A eutectic/bismuth based alloy (5) covers the collar and at least a portion of the tubular heater body and the tubular heat conducting member such that the alloy holds the heater and the tubular heat conducting member together until the alloy is melted.

31 Claims, 4 Drawing Sheets

(56) References Cited

U.S. PATENT DOCUMENTS

| | | |
|---|---|---|
| 2,686,689 A | 8/1954 | Douglas |
| 2,789,004 A | 4/1957 | Forster |
| 2,822,876 A | 2/1958 | Murrow |
| 3,119,451 A | 1/1964 | Hall |
| 3,170,516 A | 2/1965 | Corley |
| 3,208,530 A | 9/1965 | Allen |
| 3,871,315 A | 3/1975 | Anderson |
| 4,134,452 A | 1/1979 | Kingelin |
| 4,423,783 A | 1/1984 | Haag |
| 4,488,747 A | 12/1984 | Austin |
| 4,523,640 A | 6/1985 | Wilson |
| 4,696,343 A | 9/1987 | Anderson |
| 5,052,489 A | 10/1991 | Carisella |
| 5,564,861 A | 10/1996 | Khudenko |
| 6,102,120 A | 8/2000 | Chen |
| 6,454,001 B1 | 9/2002 | Thompson |
| 6,474,414 B1 | 11/2002 | Gonzalez |
| 6,664,522 B2 | 12/2003 | Spencer |
| 6,828,531 B2 | 12/2004 | Spencer |
| 6,923,263 B2 | 8/2005 | Edin |
| 7,152,657 B2 | 12/2006 | Bosma |
| 7,290,609 B2 | 11/2007 | Wardlaw |
| 2002/0162596 A1 | 4/2002 | Simpson |
| 2002/0056553 A1 | 5/2002 | Duhon |
| 2003/0132224 A1 | 7/2003 | Spencer |
| 2004/0261994 A1 | 12/2004 | Nguyen |
| 2005/0109511 A1 | 5/2005 | Spencer |
| 2006/0144591 A1 | 7/2006 | Gonzalez |
| 2007/0051514 A1 | 3/2007 | La Rovere |
| 2010/0006289 A1 | 1/2010 | Spencer |
| 2010/0263876 A1 | 10/2010 | Frazier |
| 2011/0132223 A1 | 6/2011 | Streibich |
| 2011/0146519 A1 | 6/2011 | Han |
| 2011/0174484 A1 | 7/2011 | Wright |
| 2011/0214855 A1 | 9/2011 | Hart |
| 2012/0199351 A1 | 8/2012 | Roberston |
| 2012/0298359 A1 | 11/2012 | Eden |
| 2013/0087335 A1 | 4/2013 | Carraher |
| 2013/0192833 A1 | 8/2013 | Gano |
| 2014/0318782 A1 | 10/2014 | Bourque |
| 2015/0211326 A1 | 7/2015 | Lowry |
| 2015/0211327 A1 | 7/2015 | Lowry |
| 2015/0211328 A1 | 7/2015 | Lowry |
| 2015/0345248 A1 | 12/2015 | Carragher |
| 2015/0368542 A1 | 12/2015 | Carragher |
| 2016/0145962 A1 | 5/2016 | Carragher |
| 2016/0319633 A1 | 11/2016 | Cooper |
| 2017/0030162 A1 | 2/2017 | Carragher |
| 2017/0089168 A1 | 3/2017 | Carragher |
| 2017/0226819 A1 | 8/2017 | Carragher |
| 2017/0234093 A1 | 8/2017 | Carragher |
| 2017/0234100 A1 | 8/2017 | Carragher |
| 2017/0306717 A1 | 10/2017 | Carragher |
| 2019/0085659 A1 | 3/2019 | Carragher |
| 2019/0014355 A1 | 5/2019 | Carragher |
| 2019/0186230 A1 | 6/2019 | Carragher |

FOREIGN PATENT DOCUMENTS

| | | | |
|---|---|---|---|
| GB | 2016063 | 9/1979 | |
| GB | 2 164 886 | 4/1986 | |
| WO | WO 2011/151171 | 12/2011 | |
| WO | WO 2013/066340 | 5/2013 | |
| WO | WO-2016024123 A1 * | 2/2016 | ............. E21B 19/00 |

OTHER PUBLICATIONS

U.S. Appl. No. 16/589,012, filed Sep. 30, 2019, Carragher.
Nov. 29, 2018, PCT, PCT/GB2018/051425 search report & written Opinion.

* cited by examiner

DOWNHOLE TOOL DEPLOYMENT ASSEMBLY WITH IMPROVED HEATER REMOVABILITY AND METHODS OF EMPLOYING SUCH

This application is: (i) a national stage entry under 35 U.S.C. § 371 of PCT/GB2018/051425 filed May 24, 2018, which claims priority to application serial no. GB 1713517.9 filed Aug. 23, 2017; and, (ii) is a continuation-in-part of U.S. patent application Ser. No. 16/304,251 filed Nov. 23, 2018, which is a national stage entry under 35 U.S.C. § 371 of PCT/GB2017/051458 filed May 24, 2017, which claims priority to application serial no. GB 1609137.3 filed May 24, 2016 and application serial no. GB 16142227.5 filed Aug. 19, 2016, the entire disclosures of each of which are incorporated herein by reference.

FIELD OF THE INVENTION

The present invention relates to tools for use in downhole environments such as oil and gas wells. In particular the present invention relates to tools capable of being temporarily deployed downhole and subsequently removed.

BACKGROUND OF THE INVENTION

In order to access oil and gas deposits located in underground formations it is necessary to drill bore holes into these underground formations and deploy production tubing to facilitate the extraction of the oil and gas deposits.

During the creation, operation and abandonment of oil and gas wells there is often the need to secure a tool in position within a downhole target region.

One common task is the carrying out of repairs to the existing well tubing, which due to the downhole environment can develop fractures/leaks over time. Another common task is to isolate (whether temporarily or semi-permanently) a region of a well from the rest of the production tubing.

Various downhole tools are employed in such situations. Some of the most commonly used include: bridge plugs, patches, scab and straddles. In order to secure the downhole tool within a well such tools are typically provided with hydraulically actuated means that can be operated to engage with the surface of a surrounding tubing (e.g. a well casing, well liner or production tubing).

A plurality of these engagement means, which are commonly referred to as 'dogs' or 'slips', are normally provided on a downhole tool so that once the tool is in place they can be actuated to lock the tool in position relative to the surrounding tubing.

Once the required task has been completed by the downhole tool, the 'dogs' or 'slips' can be retracted and the tool can be retrieved from the well.

Although the 'dogs' or 'slips' are capable of retaining a downhole tool in position within a well, they do not form a gas tight seal with the surrounding tubing. In view of this, on occasions where a gas tight seal is required the downhole tool is provided with additional sealing means. This can increase the possibility of a malfunction of the downhole tool.

Some types of downhole tools, such as expandable patches, are secured in position by expanding the main body of the downhole tool so that it pushes against the inner surface of the outer tubing.

Another approach, which has been developed by the applicant, utilises the interesting properties of eutectic/bismuth based alloys to help securely locate tools within downhole target regions.

In particular, published International PCT application No. WO2016/024123 discloses a variety of different options for using eutectic/bismuth based alloys mounted on the exterior walls of a tubular tool to secure the tool within a downhole target region.

In operation, a heat source is inserted into the tubular tool and positioned at a point within the tool that is adjacent to the externally mounted alloy. Once in position the heat source is used to melt the alloy, which flows a short distance before it begins to cool and turn back into a solid.

Through this process the alloy can form a connection between the tubular tool and the nearby surrounding structure, which will typically be a well casing or tubing but could also be formation. In cases where the surrounding structure is a well casing/tubing, the alloy forms a metal to metal connection between the tubular tool and the surrounding well casing/tubing.

Once the tubular tool has been secured in place, the heater is retrieved leaving the interior of the secured tool clear. In the embodiment disclosed in WO2016/024123 the retrieval of the heater is relatively straight forward because the heater and the alloy are prevented from coming into direct contact with one another by the main body of the tubular tool.

However, the retrieval of the heater becomes much more challenging when the heater and the alloy are allowed to come into direct contact with one another. This can occur in more slim-line, low profile tools where no intermediate tubing is present and the alloy is mounted directly on the heater. This is because the alloy, as it cools and turns back into a solid, can trap a portion of the heater body and prevent its extraction.

SUMMARY OF THE INVENTION

In view of the above issues faced by tools and tool deployment assemblies in which the heater is in direct contact with an eutectic/bismuth based alloy, the present invention provides an improved downhole tool deployment assembly and methods of using such.

In particular, the present invention provides a downhole tool deployment assembly, said assembly comprising: a heater with a tubular heater body having an internal cavity configured to receive a heat source; a tubular heat conducting member configured to surround the tubular heater body leaving an annular clearance, wherein the tubular heat conducting member does not extend along the entire length of the tubular heater body; a collar mounted adjacent to the region of the assembly where the tubular heat conducting member ends, wherein the collar is configured to prevent access to the annular clearance between the tubular heat conducting member and the tubular heater body; and an eutectic/bismuth based alloy covering extending over the collar and at least a portion of the tubular heater body and the tubular heat conducting member, and whereby the alloy holds the heater and the tubular heat conducting member together until the alloy is melted.

By providing an assembly in which a portion of the heater is not surrounded by intermediate tubing, but instead makes direct contact with the alloy, it is possible to reduce the overall weight of the assembly. The removal of the intermediate tubing also means that more alloy can be added to the tool without the need to extend the length of the tool.

It will also be appreciated that the weight saving made from not extending the intermediate tubing along the entire length of the heater, as has been done in the past, can enable additional alloy and/or chemical heat source material to be carried by the assembly.

It will further be appreciated that mounting the tubular heat conducting member co-axially on the tubular heater body of the heater enables the heater to continue to heat the melted alloy even after it has slumped away from, and out of direct contact with, the tubular heater body. This ensures that the necessary clearance is achieved between the heater and the tool when the alloy cools so that the heater does not become trapped by the alloy.

At the same time, releasably mounting the tubular heat conducting member on the heater primarily using the alloy facilitates the detachment of the heater from the tool once the alloy has melted.

Removing the heater leaves behind the tubular heat conducting member. The member, which remains secured in position within the downhole target region by the re-solidified alloy, forms the tool. It will be appreciated that secured tubular member, in combination with the alloy, may provide a downhole platform upon which other tools, such as straddles, can be deployed.

Alternatively the tool itself may serve as a plug if the tubular member is blocked (e.g. with an end plate or burst disk).

In addition, it will be appreciated that removing the heater greatly reducing the amount of material that has to be cleared (i.e. by milling/drilling) from the wellbore in the event that it becomes necessary to remove the tool from the well at a later date.

The clearance between the heater tubular body and the annular heat conducting member ensures that, once the alloy has melted and slumped, the heater can be retrieved from within the annular heat conducting member so as to reveal the internal cavity of the annular heat conducting member.

The potential issue of the heater being trapped by the alloy as it re-solidifies, which can occur when the heater and alloy remain in direct contact, is addressed by the provision of the collar, which provides a clear break point between the heater and the deployed downhole tool that is formed when the tubular heat conducting member combines with the alloy.

The collar is positioned at the trailing end of the tubular heat conducting member to ensure that the melted alloy cannot flow into the clearance gap provided between the heater tubular body and the tubular heat conducting member. It is envisaged that if the alloy was able to flow into the clearance gap it could form a connection between the body and member that would hamper the retrieval of the heater.

Preferably the alloy may be at least partially enclosed within an insulating sleeve. Providing a sleeve with insulating properties is considered highly beneficial because it serves to reduce heat loss from the tool of the present invention. This means that any heat generated by the tool is used more efficiently, which in turn means that less chemical heat source material, for example, is needed to achieve a certain heat output. This again allows the weight of the assembly to be reduced.

This more efficient use of the chemical heat source material also means that less space needs to be given over to the cavity in the heater body, which in turn enables the overall diameter of the tool to be decreased without necessarily also increasing the length of the heater.

Providing an outer sleeve with insulating properties also helps to prevent heat being 'sucked away' from the tool as a consequence of the environmental conditional within the target region. By way of an example, it is envisioned that insulating the tool in this way prevent heat loss as a result of 'cross-flow' within the well.

'Cross-flow' occurs when fluids move down a pressure gradient within the well and in doing so create a flow of fluids passed the target region which could remove heat from the region over time.

Providing the insulation also helps to 'super heat' the alloy that is held between the heater body and the sleeve. This enables the molten alloy to penetrate further into the surrounding environment when it eventually leaves the tool. This is considered particularly beneficial when forming seals in wells located in sand pack formations, (e.g. OHGPs).

Preferably the insulating sleeve may comprise one or more openings in the region adjacent to the collar. Alternatively the insulating sleeve may comprise one or more weakened points in the region adjacent to the collar; said weakened points being configured to fail before the rest of the insulating sleeve.

It is appreciated that by providing openings in the sleeve, or alternatively weakened regions that will become openings in the sleeve during the operation of the heater, it is possible focus the locations where molten alloy escapes. Locating the openings/weakened regions adjacent the collar of the heater ensures that the alloy is ejected in the vicinity of the annular heat conducting member.

Preferably the tubular heat conducting member may be formed from aluminium. However it is envisaged that steel alloys may alternatively be used.

Preferably the tubular heat conducting member may further comprise a skirt portion located at the end of the tubular heat conducting member remote from the collar. The skirt portion facilitates the cooling of the molten alloy as it flows down the assembly because it enables cooler downhole fluids to collect within the open end of the skirt.

Preferably the tubular heat conducting member may further comprise an end plate located at the end of the tubular heat conducting member remote from the collar. The end plate closes off the tubular heat conducting member so that the tool, once deployed, forms a plug in the well.

In addition, the end plate, together with the collar, limits the extent to which the tubular heater body can be received within the tubular heat conducting member.

Preferably additional releasable fixing means may be provided to retain the heater within the tubular heat conducting member. One example of a suitable releasable fixing means would be shear pins. Another alternative releasable fixing means is a shear ring.

Preferably the internal cavity of the tubular heater body may contain a chemical reaction heat source. Further preferably the chemical reaction heat source may comprise a plurality of stacked blocks (e.g. thermite blocks), wherein the heating characteristics of each block may vary along the stack. However, it is appreciated that the chemical reaction heat source may also be provided as fragmented thermite blocks (i.e. crumble) and/or in powdered form.

Preferably the inner walls of the tubular heater body may be provided with a layer of a refractory material. Examples of materials that are considered suitable for the refractory lining include fibre glass, Kevlar® and a coating of ceramic material, such as zirconium oxide ($ZrO_2$), aluminium oxide, magnesium oxide. Other suitable refractory materials will be appreciated by the skilled person upon consideration of the following explanation.

Coating the inside of the tubular heater body with a refractory lining provides a number of benefits.

One benefit of having a lining within the heater body is that it prevents the chemical heat source material (e.g. thermite) from sticking to the inside surface of the tubular heater body. This is a problem in heaters where it is desirable for the molten heat source to flow within the tubular heater body. Essentially the refractory lining serves to reduce the wettability of the inside surface of the heater body and prevent the heat source material clumping within the cavity.

Preventing the molten heat source material from sticking to the tubular heater body stops the heat source material from concentrating heat in a particular spot and melting through the wall of the heater body at that point.

Another benefit of the refractory lining is that it affords some heat shielding to walls of the tubular heater body, which in turn enables the heater body walls to be made thinner without risk of them being burned through.

Preferably the lining may be made from fibre glass, Kevlar®, or provided as a ceramic layer coated on the inner walls of the tubular heater body. One example of a suitable ceramic material is $ZrO_2$. By way of some background it is note that refractory coatings are often used, in the casting industry, in equipment to transfer molten metals. However these are generally used in conjunction with low-melting point alloys such as aluminium or bronze, which have melting points in the range of 500 to 1000 degrees C.

Refractory coatings are generally not recommended for use with high-temperature molten materials such as iron or steel. This is relevant because steel is one of the preferred materials used for chemical heater bodies of the present invention. In contrast to aluminium and bronze, iron and steel have melting points of about 1500 and 1400 degrees C., respectively.

The aluminium/iron oxide thermite which is commonly used as the chemical reaction heat source in the heaters of the present invention, in further contrast, has a reaction temperature of about 3200 degrees C.

Typically, refractory coatings are generally only rated to a range of about 1500 to 1800 degrees C. Therefore one would not normally consider a refractory coating as a viable method to protect a steel heater tube from molten thermite.

However, is has been surprisingly discovered that heater body 'burn-throughs', when they do occur, usually happen within less than a minute after the thermite is ignited. In view of this, it has been discovered that if a refractory coating could survive long enough for the heater tube to endure this critical one-minute interval, 'burn-throughs' could be prevented.

Zirconium oxide was selected as the coating material for testing based on its relatively high (1800 degrees C.) operating temperature rating, and on the fact that its coefficient of thermal expansion (CTE) is closer to that of steel than do most other ceramic materials. This is an advantage because the greater the mismatch in CTE, the more likely a coating is to spall off the heater tube walls at elevated temperatures.

Also, zirconium oxide has low thermal conductivity, which can provide some benefit in delaying, or spreading out over time, the heat transfer from the termite reaction products to a steel heater tube, for example. Perhaps more importantly, zirconium oxide does not have a chemical affinity to iron, and thus is less likely to be wetted by the iron by-products from the termite reaction.

As detailed above, the downhole tool deployment assembly according to a first aspect of the present invention makes use of the collar to ensure that alloy cannot cool and re-solidify over the separation or break point between the heater and the tubular heat conducting member (sometimes referred to as a mandrel).

However it is envisaged that the benefit provided by the collar may also be achieved with alternative variants of downhole tool deployment assemblies. One such variant takes the form of a two-part heater downhole tool deployment assembly, which, unlike the downhole tool deployment assembly described above, does not employ a tubular heat conducting member (i.e. mandrel).

In view of this a second aspect of the present invention provides a downhole tool deployment assembly comprising: a heater with a tubular heater body having an internal cavity configured to receive a heat source, wherein the tubular heater body is comprises an up-hole section and a downhole section that are separated by a point of weakness; a collar mounted adjacent to the point of weakness, wherein the collar is configured to cover the point of weakness; and a eutectic and/or bismuth based alloy covering extending over the collar and at least a portion of both the up-hole section and the downhole section of the tubular heater body, and whereby the alloy holds the up-hole and downhole sections of the tubular heater body together until the alloy is melted.

It will be appreciated that the role of the collar is again to keep the region of the assembly where separation takes place clear from alloy once the heater has been operated to melt the alloy. In particular, keeping the point of weakness of the tubular heater body free of alloy makes the process of separating the up-hole section of the heater body from the downhole section of the heater body. In this way, the up-hole section of the heater body can be retrieved from the well, whilst the downhole section remains in place.

It has been discovered that in operations were a mandrel is not used, (i.e. the alloy is deployed downhole mounted directly on the tubular body of a heater) the two-part heater design achieved a better seal. In this regard, it was found that leaving the lower portion of the heater body in the well facilitates the alloy re-solidification process and in so doing delivered a better seal in the downhole target region.

In order to facilitate the retrieval of the up-hole section of the heater body, in use, the point of weakness of the tubular heater body is located between the lowermost end of the up-hole section and the uppermost end of the downhole section of the tubular heater body.

The point of weakness may take the form of region of the heater body tubing that has been partially milled or drilled away to reduce the thickness of the wall. In this arrangement the heater body is formed from a single tubular member that can be broken into two parts by simply pulling on the up-hole section once the weakened region is no longer covered by alloy.

Alternatively the point of weakness may take the form of fixing means that connects the up-hole and downhole sections of the tubular heating body together. It is envisaged that the strength of the fixing means will be configured so as to fail when a predetermined force is applied to the assembly to retrieve the up-hole section of the tubular body. Examples of suitable fixings means include: shear pins, a shear ring or a destructible screw thread.

Once again, it is envisaged that without the structural support of the alloy mounted over the fixing means the up-hole section can be readily separated from the downhole section of the heater body and retrieved out of the well.

As the assembly of this second aspect of the present invention is very similar in operation to the assembly of the first aspect it is appreciated that many of the additional features detailed for the first assembly are equally applicable to the second assembly. In view of this it is noted that it is contemplated that additional technical benefits may be achieved to the assembly of the second aspect of the present invention by adopting the preferable features detailed above and described further below.

In particular, it is noted that the downhole section of the heater body may be blocked so as enable the section to function as a plug.

Further, an insulating sleeve may be provided to achieve the heating efficiencies outlined above.

A skirt portion may be provided at the leading end of the downhole section of the tubular heating body to help facilitate the cooling of the heated alloy as it flows away from the region of the heater where the heat source is provided.

Once again, the internal cavity of the tubular heater body may contain a chemical reaction heat source. Further preferably the chemical reaction heat source may comprise a plurality of stacked blocks (e.g. thermite blocks), wherein the heating characteristics of each block may vary along the stack. However, it is appreciated that the chemical reaction heat source may also be provided as fragmented thermite blocks (i.e. crumble) and/or in powdered form.

Preferably the inner walls of the tubular heater body may be provided with a layer of a refractory material. Examples of materials that are considered suitable for the refractory lining include fibre glass, Kevlar® and a coating of ceramic material, such as zirconium oxide ($ZrO_2$), aluminium oxide, magnesium oxide. As explained above, other suitable refractory materials will be appreciated by the skilled person.

The present invention also provides a method of deploying a downhole tool within an oil/gas well, said method comprising: delivering into a target region of an oil/gas well a tool deployment assembly according to the present invention; activating the heater to melt the eutectic/bismuth alloy layer; allowing the alloy to cool and secure the tubular heat conducting member in position within the oil/gas well; extracting at least a section of the heater from within the tubular heat conducting member and retrieving the heater from the oil/gas well.

It is envisaged that in its broadest application, the method of the present invention does not require that the alloy is deployed downhole with the rest of the platform deployment tool. This is because the benefits of the heater retrieval are achieved by providing a clearance between the heater and the re-solidified alloy. This clearance is achieved regardless of whether the alloy is deployed down-hole with the rest of the tool or separately.

However, in operations where the alloy is deployed separately it is envisaged that additional fixing means (e.g. shear pins) will be required to maintain the connection between the tubular heat conducting member and the tubular heater body. This is because the alloy is not initially present to hold the body and the member together.

It is envisaged that the downhole tool deployed by the method of the present invention is suitable to support the deployment of a straddle tool. Straddles are typically used to provide a bypass conduit within an existing region of production tubing.

In a further aspect the present invention provides a method of deploying a by-pass conduit, such as a straddle, within an oil/gas well, said method comprising: deploying a downhole tool platform within an oil/gas well using the above method of deploying a tool; providing a length of tubing with eutectic/bismuth based alloy mounted on the outer wall of said tubing; delivering the tubing onto the downhole tool; heating the tubing so as to melt said alloy; and allowing the eutectic/bismuth based alloy to cool and secure the tubing in position within the oil/gas well.

It is envisaged that the above method could be carried out using the downhole tool deployment assembly of either the first aspect or the second aspect of the present invention.

Preferably the alloy provided on the tubing may be in the form of an annular packer.

Alternatively the length of tubing may comprise a second tool deployment assembly according to the present invention.

Preferably the tubing may be heated using a heater located within the tubing.

Preferably the heater may comprise a chemical heat source. Although other heat sources, such as electrical, might be used to heat the alloy, chemical heat sources are considered preferable due to the technical difficulties of operating electrical heaters reliably at greater distances from the surface.

Preferably the heater may be retrieved once the alloy has cooled. In this way the central space through the middle of the annular heat conducting member of the platform is exposed to permit the subsequent flow of fluid through the platform to the straddle and beyond.

Preferably the tubing may further comprise an expandable tubular member that can be expanded to increase its diameter. In this way the flow rate through any by-pass conduit might be increased.

The present invention also provides a method of sealing an oil/gas well, said method comprising: delivering into a target region of an oil/gas well a tool deployment assembly according to the second aspect of the present invention; activating the heater to melt the eutectic/bismuth alloy layer; allowing the alloy to cool and secure the downhole section of the tubular heating body in position within the oil/gas well to form a seal within the target region; retrieving the up-hole section of the tubular heater body from the oil/gas well.

BRIEF DESCRIPTION OF THE DRAWINGS

The various aspects of the present invention will now be described with reference to preferred embodiments shown in the drawings, wherein.

DETAILED DESCRIPTION OF THE VARIOUS ASPECTS OF THE PRESENT INVENTION

The downhole tool deployment assembly of the present invention disclosed herein is considered particularly suitable for use in downhole operations that take place within gas and oil wells. In particular, the well tool deployed in accordance with the present invention is considered particularly suitable for use in repair operations involving Open Hole Gravel Packs.

The term 'Open Hole Gravel Pack' (OHGP) is used throughout to indicate when a screen is used to hold back proppant/sand in a completion. It will be appreciated that, in practise, this covers all gravel pack completions including open hole, cased hole and frac packs.

Although the sealing and repair of Open Hole Gravel Pack is considered a particular suitable application of the present invention, it is envisioned that the downhole tool deployment assembly of the present invention can also be employed in other well repair operations, as well as in well abandonment.

Given the main focus of the present invention, the preferred embodiments will be described with oil and gas wells in mind. However, it is envisioned that the apparatus and methods described could be usefully applied in other technical fields, such as those fields where underground conduits are to be plugged (e.g. water pipes).

Figure 1:
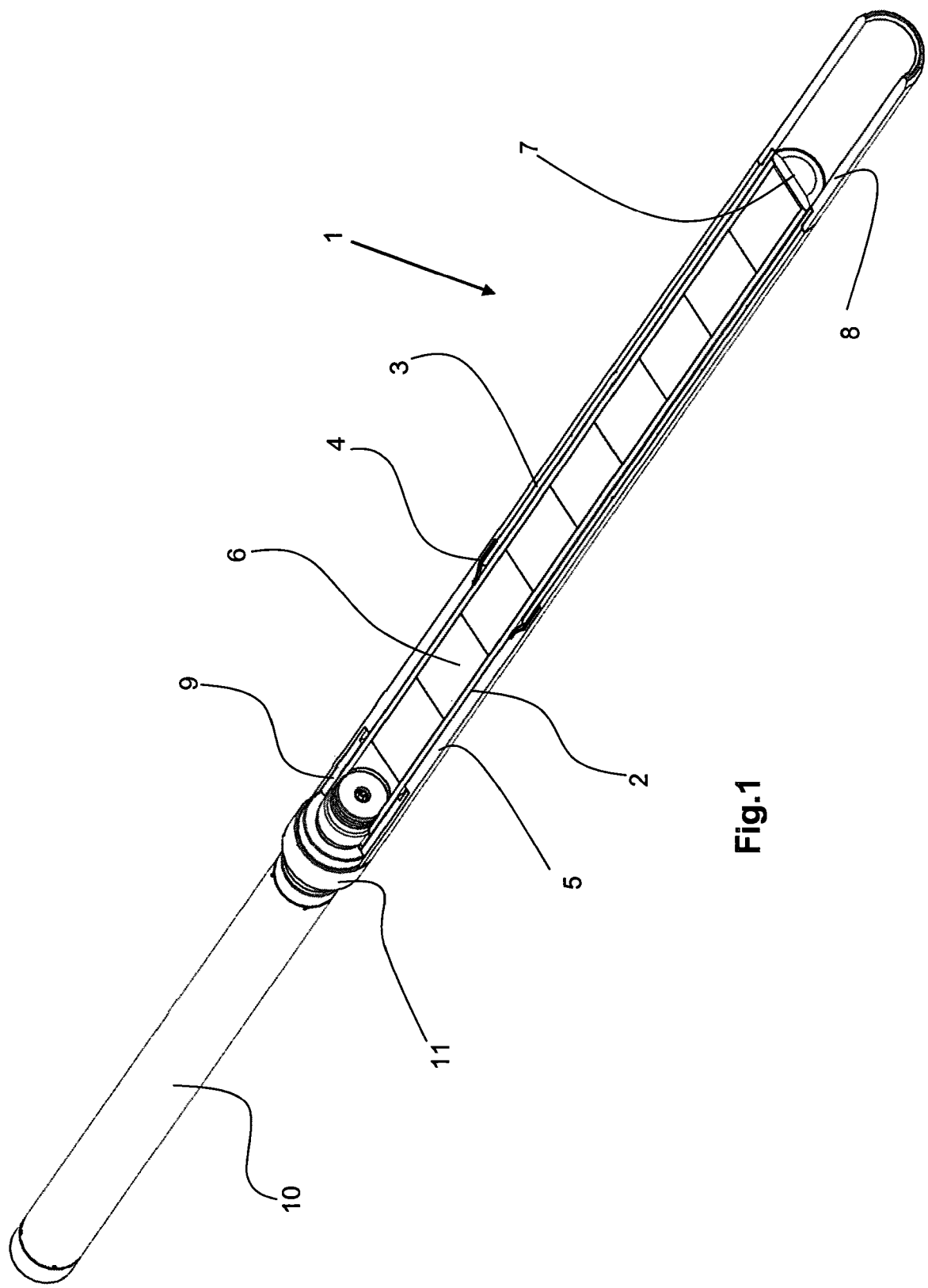
FIG. 1 shows a partially exposed view of a preferred embodiment of a downhole tool deployment assembly of a first aspect of the present invention engaged with running tool.

The main components of the downhole tool deployment assembly of the present invention are shown in FIG. 1, which provides a partially exposed view of a preferred embodiment of the assembly 1.

The assembly 1 is constructed from a heater with a tubular heater body 2, at least a portion of which is received within a tubular heat conducting member 3. Unlike previous downhole tool deployment assemblies, the tubular member 3 that is positioned on the outside of the tubular heater body 2 only receives a portion of the heater body. As a result, a significant portion of the heater body is exposed and is not surrounded by the tubular member 3.

Although not essential, it is envisaged that the assembly of the present invention is particularly suited to chemical heat source based heating, using for example thermite-based heat sources. The chemical heat source material is housed within the internal cavity of the tubular heater body 2. In the preferred embodiment, the chemical heat source material is provided in the form of a plurality of thermite blocks 6.

Also, although not shown it is envisaged that additional benefits may be gained by providing a refractory layer or coating between the chemical heat source material and the heater tubular body. The benefits of providing a refractory coating are discussed above.

This partial covering of the tubular heater body 2 distinguishes the assembly of the present invention from downhole tool deployment assemblies of the past, in which the heaters were either entirely received within an outer tubular member or there was no outer tubular member at all provided.

It will be appreciated that in those downhole tool deployment assemblies where no outer tubular member is present, the alloy is provided directly onto the heater body rather than on an intermediate tubular body.

The arrangement of the downhole tool deployment assembly of the present invention is such that the weight of the assembly is reduced by essentially removing a significant portion of the tubular member 3, which would have otherwise been present if the entire length of the tubular heater body 2 was to be received.

The omission of a portion of the tubular member 3 serves to create more space to accommodate the eutectic/bismuth based alloy, which is provided on the outside of the assembly without necessarily increasing the profile (i.e. external diameter) of the assembly.

By way of some context, previously the addition of more alloy to the assembly would have resulted in the assembly being made longer and/or fatter (i.e. increased diameter).

In some situations the shape of the target well can impose a maximum limit on one or more of these dimensions. It is on these occasions that assemblies without an intermediate tubular member (i.e. alloy provided directly on heater) might have been deployed. As detailed above, however, this approach can face difficulties when it is desirable to retrieve the heater from the well after the alloy has cooled and re-solidified due to the heater becoming trapped by the re-solidified alloy.

In view of the above, it will be appreciated that increasing the space available to accommodate alloy on the assembly without increasing the overall profile of the assembly is advantageous. Further, reducing the weight of the assembly can also make it easier to handle above-ground and deploy downhole.

Although in the downhole tool deployment assembly shown in the figures about a third of the tubular heater body 2 is exposed (i.e. not received within tubular member 3), it is envisaged that this ratio may be varied depending on the requirements of a particular task. Ultimately, however, it is a key feature of the present invention that at least a portion of the heater tubular body 2 extends out of the outer tubular member 3.

Preferably, at least 25% of the heater tubular body 2 must be received within the outer tubular member 3. That is to say, at least 75% of the heater tubular body 2 is exposed and in direct contact with the alloy. However it is envisaged that the extent to which the heater tubular body 2 is received within the outer tubular member 3 will depend on the outer diameter of the tool and/or the inner diameter of the well bore.

The dimensions of the tubular heater body 2 are such that it can be slideably received within and retrieved from the outer tubular member 3. To this end, there must be a suitable clearance, preferably around 1 mm, between the outer diameter of the tubular heater body 2 and the inner diameter of the tubular member 3.

Once received within the tubular member 3, the tubular heater body 2 is held in place by an outer coating of eutectic/bismuth based alloy 5. This arrangement ensures that the tubular heater body can only be removed from the tubular member 3 once the alloy 5 has been melted.

Although not shown, it is envisaged that addition temporary fixing means may be provided to supplement and support the connection of the tubular heater body 2 to the outer tubular member 3. Such additional temporary fixing means may take the form of shear pins or shear rings. However alternatives will be appreciated by the skilled person upon consideration of the invention as a whole.

As can been seen from FIG. 1, the alloy 5 preferably extends along the entire length of the heater body 2. Of course, for at least a portion of that length the alloy 5 is separated from the tubular heater body 2 by the outer tubular member 3.

This co-axial arrangement of the alloy 5 and the tubular heater body 2 ensures that the alloy is effectively heated. In will be understood that the presence of the intermediate tubular member 3 may result in an uneven heating of the alloy along the length of the assembly because some of the alloy is in direct contact with the heater and some of the alloy is not.

Heating uniformity can be achieved by making the outer tubular member 3 from a heat conducting material, such as Aluminium. Other examples include steel alloys. In this way the heat from the heater can readily pass through the intermediate tubing to the alloy.

Alternatively or additionally, uniform heating of the alloy might also be achieved by using a predetermined arrangement of chemical heat source material blocks 6 with varying heat generation characteristics. In this regard, the applicant earlier International PCT filing (Pub. No. WO 2014/096857) deals with the provision of chemical heat sources that can be tailored to create specific heating patterns by stacking blocks with differing mixtures of thermite and damping agent.

In the case of the assembly of the first aspect of the present invention, it is envisaged that the heating blocks located in the exposed portion of the tubular heater body might include an increased proportion of damping agent when compared to the blocks located in the portion of the heater body that is received within the outer tubular member. In this way the exposed heater portion can be configured to emit less heat than the received portion, thereby providing a more uniform heat along the entire length of the alloy.

The tubular heater body 2 is provided with ignition means 11 at the trailing end thereof (i.e. the end that enters the well hole last). The ignition means 11 are inserted into the open end of the tubular heater body 2 and secured in position, preferably using a screw thread arrangement—although other fixing arrangements may be employed.

Once in position, the ignition means 11 is configured to enable the heater, and as a result the assembly 1 as a whole, to a running tool 10. The running tool 10, together with above-ground delivery tools, facilitates the delivery of the assembly 2 down the well hole.

The tubular heater body 2 is closed at the leading end, which is the end opposite where the ignition means 11 is received. This enables the heat source material 6 to be received and housed within the heater tubular body 2.

The tubular member 3 is provided with an end plate 7, which is secured onto the leading end of thereof. The end plate 7 is preferably secured in position by welding; however alternative attachment methods will be appreciated. For example, it is envisaged that the tubular member 3 may be blocked by a burst disk that is held in position by 'O' rings or a metal sealing ring. The provision of a burst disk means that the tubular member 3 can be quickly unblocked at a later date to suit the needs of a particular well.

The end plate 7 serves to close off the end of the tubular member 3 such that, once deployed, the combination of the tubular member and the re-solidified alloy form a downhole tool that plugs the well hole.

The end plate 7 is a preferred feature of the tubular member 3. In view of this it is envisaged that in some assemblies, where a plug is not required (i.e. by-pass conduits), the end plate 7 need not be present.

The tubular member 3 is also provided with a skirt portion 8. The skirt portion may be secured to the leading end of the tubular member 3 by a screw thread or by welding. Other attachment mechanisms may also be employed without departing from the general concept of the present invention. The skirt portion is preferably made of high strength steel, although other suitable materials will be envisaged by the skilled person upon consideration of the described invention.

Alternatively, the skirt portion 8 may be formed as part of the tubular member 3. In this arrangement the length of the skirt portion would be determined by the location of the end plate 7 within the tubular member 3.

The role of the skirt portion is to provide a cooler region adjacent the heater where the molten alloy can start to cool and solidify. Cooling is achieved by allowing downhole fluids to get inside the skirt portion 8, whereby the heat energy present in the skirt portion due to the heater can be more quickly transferred away by the downhole fluids.

This cooling of the skirt portion relative to the directly heated region of the tubular member 3 helps to begin the alloy re-solidification process, which helps prevent molten alloy simply dripping off the end of the assembly 1 and falling down the well.

As can be seen from FIG. 1, the eutectic/bismuth based alloy 5 coats a large portion of the assembly, covering most of the exposed heater tubular body 2, the tubular member 3 and the collar 4.

It will be appreciated that the thickness of the alloy 5 coating varies along the length of the assembly 1 to take advantage of the additional space provided by the omission of the tubular member 3 towards the trailing end of the assembly 1. The alloy coating is such that the outer diameter of the assembly remains consistent along the length of the assembly, whilst retaining more alloy that would have been possible if the tubular member 3 extended the entire length of the assembly.

In view of the relatively soft nature of the alloy 5, the assembly is also provided with an anti-crush member 9. The anti-crush member 9, which is formed from a material with greater mechanical strength than the alloy 5 (e.g. steel), is located at the trailing end of the assembly 1 adjacent to open end of the tubular member 3 in to which the ignition means 11 are inserted.

The anti-crush member 9 provides the upper region of the assembly with increased structural strength that enables the assembly to gripped and manoeuvred by mechanical handling equipment above ground without being damaged or deformed.

It will be appreciated from FIG. 1 that the anti-crush member 9 is configured to ensure that the consistent outer diameter of the assembly is maintained. To this end, a reduced thickness of alloy (or possibly no alloy) is provided in the region of the anti-crush member 9.

Although not shown, it is envisaged that the assembly 1 may further be provided with an outer insulating layer or covering that completely encloses the alloy. The insulating layer/covering is preferably provided with openings or weakened regions so as to provide specific egress points for the alloy as it melts. The benefits of providing the outer insulating layer are described above.

The operation of the downhole tool deployment assembly of the first aspect of the present invention will now be described with reference to FIG. 2, which shows the key stages of the downhole tool deployment method.

In the first stage the ignition means 11 is attached to the assembly 1 and then attached to the running tool 10. The running tool 10, which is engaged with a delivery tool (not shown) is then used to deliver the assembly 1 to a downhole target region within a well casing/tubing 12.

Once in position at the target region the ignition means 11 are activated and the chemical reaction of the chemical heat source (e.g. thermite based heat source) is started. The heat given off by the chemical heat source melts the alloy 5 directly, and indirectly via the tubular member 3, causing the alloy to flow. As the alloy 5 flows it is immediately subjected to the cooling influences of the surrounding downhole environment (i.e. downhole fluids), which typically have a temperature range of around 20 to 170° C.

As soon as the alloy 5 flows away from the heat being generated by the chemical heat source it starts to cool and, as it does, re-solidify. This cooling process is further assisted by the provision of the skirt portion 8 at the leading end of the assembly. As will be appreciated, the skirt portion 8 allows the downhole fluids to cool the alloy from both outside and inside the assembly 1.

Figure 2:
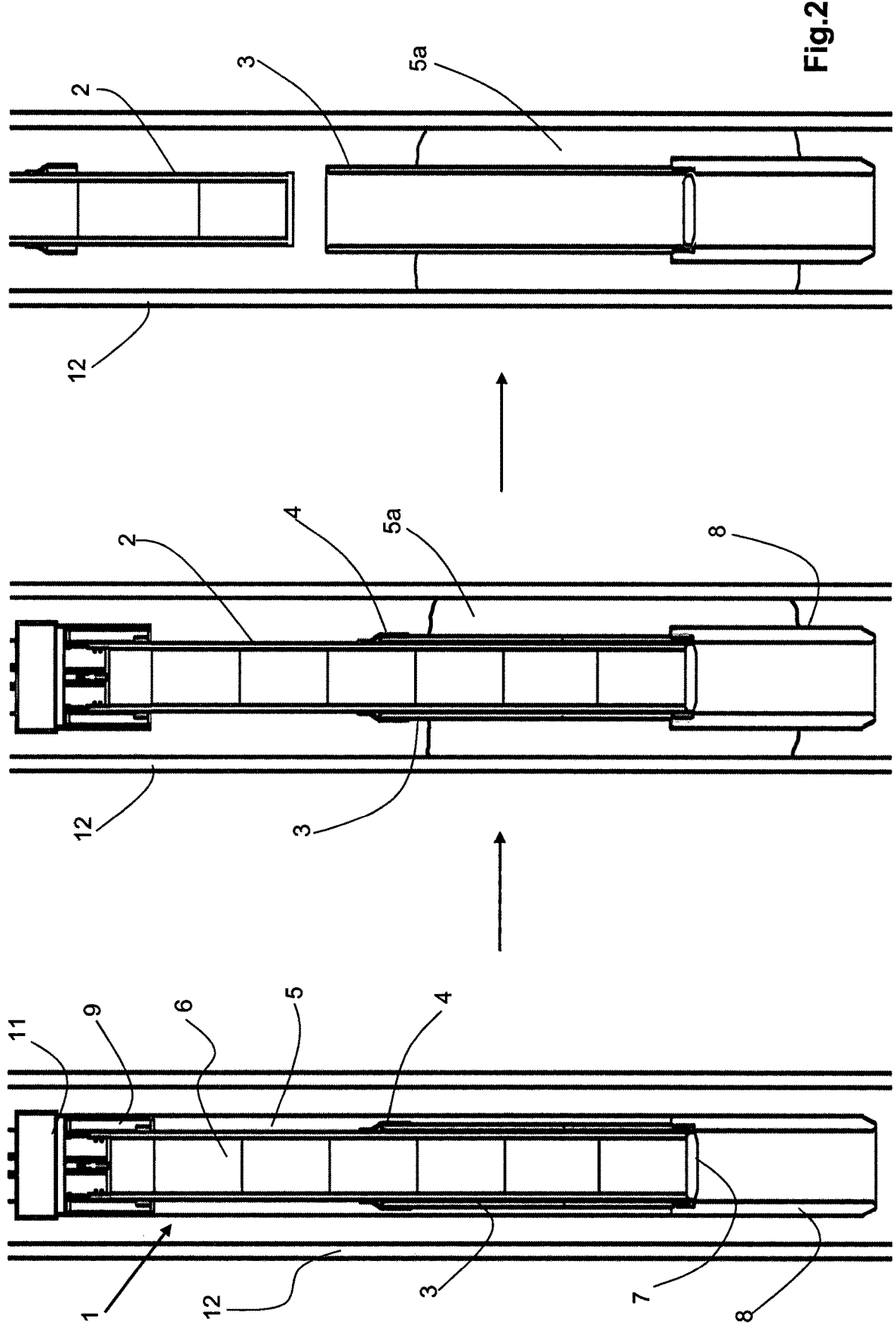
FIG. 2 provides a diagrammatic representation of the key stages of deploying a downhole tool in well tubing using the downhole tool deployment assembly of the first aspect of the present invention.

As will be appreciated from the second stage shown in FIG. 2, the alloy flows away from the exposed portion of the tubular heater body 2 cooling as it flows until it forms any annular alloy seal 5a between the tubular member 3 and the surrounding well casing/tubing 12. The flow of the alloy is such that clearance is achieved between the alloy seal 5a and the exposed portion of the tubular heater body 2. The alloy flow also provides clearance between the collar 4 and the annular alloy seal 5a.

In the final stage, the running tool 10 can be used to extract the tubular heater body 2 from within the tubular member 3 and then retrieve it from the downhole environment.

The formation of the annular alloy seal 5a serves to lock the tubular member 3 in position within the well casing, thereby completing the deployment of the downhole tool.

While the downhole tool (i.e. the tubular member 3 and the alloy 5a) is held in position within the well casing/tubing, the tubular heater body 2 is no longer held securely within the tubular member 3 due to the relocation of the alloy that previously held the tubular heater body 2 and the tubular member 3 together.

With the tubular member 3 held firmly in place and the tubular heater body 2 released, the operation of the running tool 10 readily extracts the tubular heater body so that it can be retrieved from the well casing 12.

If additional fixing means are provided (e.g. shear pins/rings), such will be configured with a break point that is lower than the expected failure level of the alloy plugs, such that the fixing means fail when the heater is retrieved using the delivery tool.

The provision of the collar 4 ensures that no alloy can flow into the gap between the tubular heater body 2 and the outer tubular member 3 and cool, which, it will be appreciated, could seal the tubular heater body 2 and the outer tubular member 3 together and prevent them being readily pulled apart.

The removal of the tubular heater body and the running tool leaves the downhole tool secured in position within the well casing. It is envisaged that, due to the presence of end plate 7 within the tubular member 3, the preferred embodiment of the downhole tool shown in the figures can be used as a permanent or semi-permanent plug.

Alternatively, if the end plate were to be omitted, the downhole tool might instead be used as a platform to support the deployment of a straddle or other by-pass conduit within a target region of a well.

Figure 3:
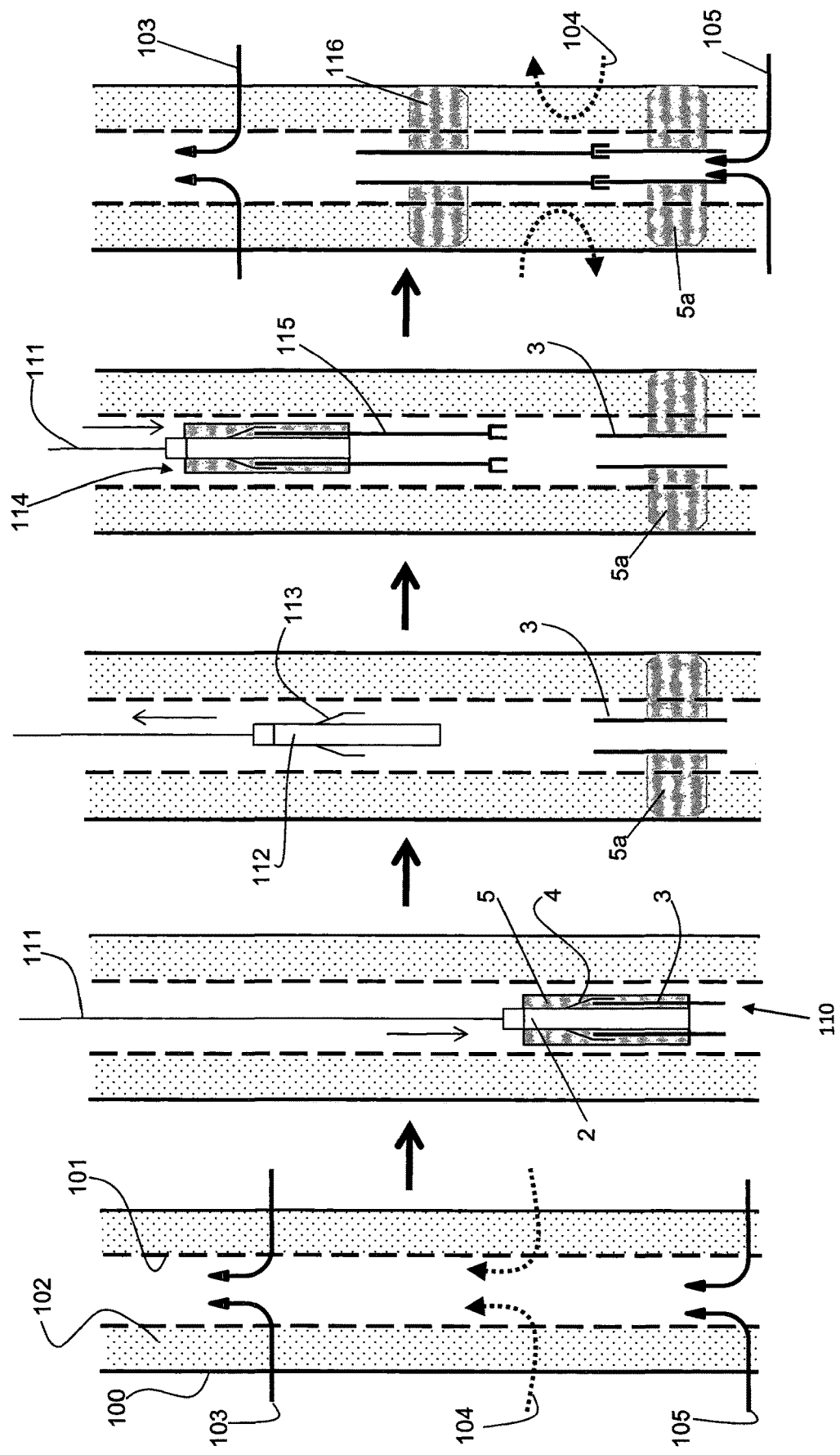
FIG. 3 is a diagrammatic representation of the key stages of deploying a straddle in an open hole gravel pack (OHGP) using the downhole tool deployment assembly of the first aspect of the present invention.

FIG. 3 shows a diagrammatic representation of the key stages of deploying a straddle within an Open Hole Gravel Pack (OHGP) of a well.

In the first stage an operating oil well with an OHGP is shown. An open hole 100 is formed in an underground formation so as to access an underground oil/gas reservoir.

The oil/gas is extracted from the reservoir via the production tubing 101, which in the region of the reservoir comprises a screen with a plurality of slots or apertures designed to allow the free flow of downhole fluids, including oil, into the tubing and ultimately out of the well.

In order to prevent the slots or apertures of the tubing 101 becoming blocked, a proppant 102 is provided between the tubing 101 and the surrounding formation 100.

In the past, in order to form a plug within an OHGP it would be necessary to first perforate the region in order to facilitate the setting of a cement plug. This is because the cement would otherwise not be able to flow through the slots or apertures of the tubing 101 and the surrounding proppant 102.

However, the present invention utilises the distinctive characteristics of eutectic/bismuth based alloys to form plugs in this environment without the need to carry out any perforation processes.

Returning to the first stage of FIG. 3, it can be seen that three different fluid streams are exiting the formation 100 and entering the production tubing 101.

The first stream 103 and the third stream 105 represent a fluid with an acceptable proportion of oil to water. However the second stream 104 represents a fluid with a much higher proportion of water, which is undesirable.

When the streams 103, 105 and 104 combine within the production tubing 101 they produce a combined fluid with a much less commercially acceptable oil to water ratio. In view of this it is highly advantageous to the economic viability of the well if the first fluid stream 103 and the third fluid stream 105 can be isolated from the second fluid stream 104. However the positioning of the second fluid stream source between the first and third fluid stream sources makes it difficult to do this.

The downhole tool deployment assembly of the present invention enables the deployment of a by-pass conduit, such as a straddle, within the production tubing 101 to isolate the non-oil producing fluid stream 104 from the other neighbouring oil producing streams 103 and 105.

Although the straddle tool is not shown in detail in FIG. 3, it should be understood that the straddle is preferably formed from a pair of tool components that are each set in place using the downhole tool deployment assembly of the present invention In the second key stage shown in FIG. 3 a downhole tool deployment assembly 110 of the present invention is run into the well bore 100 using a wire line 111.

As will be appreciated from the previous descriptions, the assembly 110 comprises a heater body 2 that is partially received within the outer tubular member 3. Unlike in the embodiment shown in FIGS. 1 and 2, however, in this arrangement the outer tubular member is not provided with an end plate. This ensures that the outer tubular member 3 can perform its function as part of the by-pass conduit.

The heater body 2, which it will be appreciated preferably houses a chemical heat source (not shown), is provided with a collar 4.

A eutectic/bismuth based alloy 5 covers the heater body 2, outer tubular member 3 and the collar 4. It is appreciated that the alloy may preferably be at least partially enclosed within an insulating sleeve. However the sleeve has not been included in FIG. 3 to avoid overcomplicating the diagrammatic representation.

Once in position within the production tubing 101, the heater is activated, preferably using a signal transmitted via the wire line 111, and the alloy 5 is melted. As the molten alloy flows away from the heater it begins to cool and re-solidify, thereby causing the formation of an alloy plug 5a within the well bore 100.

Following the formation of the alloy plug 5a, the heater body 2 and the attached collar 5 can be retrieved from the well using the wire line 111. This stage is shown in the third key stage of FIG. 3. It will be appreciated that the second and third key stages of FIG. 3 proceed in accordance with the stages shown in FIG. 2, as described above.

Following the removal of the heater/collar, a second downhole tool deployment assembly 114 can be run down the well into the target region just above the plug 5a. This is shown in the fourth key stage of FIG. 3.

The second downhole tool deployment assembly 114 is similar to the first assembly 110, however it is preferably provided with a length of tubing 115 that extends from the leading end of the outer tubular member 3. It is envisaged that the tubing may be formed as part of the outer tubular member or it may simply be attached to it by standard connection means (i.e. screw threaded engagement).

The leading end of the tubing 115 is provided with means for engaging the trailing end of the outer tubular member 3 of the tool deployed by the first downhole tool deployment assembly 110. It is envisaged that any arrangement that facilitates the alignment of the central cavities of the tubing 115 with the outer tubular member 3 of the tool deployed by the first downhole tool deployment assembly 110 is considered suitable.

Preferably the engagement formed between the tubing 115 and the outer tubular member 3 of the tool deployed by the first downhole tool deployment assembly 110 is fluid tight to ensure that fluid entering the by-pass conduit is transported the full length of the conduit and does not escape via the joint between the two components.

Once the tubing 115 and the outer tubular member 3 of the tool deployed by the first downhole tool deployment assembly 110 are suitably engaged within the well bore, the heater of the second assembly 114 is activated and its associated alloy melted.

As before, the molten alloy will flow away from the heater and cool to form a plug 116 within the well bore. The two plugs 5a and 116 serve to both hold the two tool components of the by-pass conduit together and prevent fluids flowing around the plugs via the proppant 102.

The final stage of FIG. 3 shows the by-pass conduit being held in position by the upper alloy plug 116 and the lower alloy plug 5a. Once in position, the by-pass conduit facilitates the flow of the first 103 and third 105 fluid streams out of the well via the production tubing 101, whilst at the same time isolating the second, undesirable fluid stream 104.

It is envisaged that the tubing 115 of the by-pass conduit shown in FIG. 3 may comprise an expandable tubular member that, in use, is located between the two alloy plugs 5a and 116. In this way, once the plugs have been set within the well, the diameter of the tubing can be expanded to allow for an increased flow rate through the by-pass conduit.

In a further alternative improvement the tubing 115 may be provided with at least one eutectic/bismuth based alloy annular packer. In this way the annular packer could be activated at a later stage if a leak were to develop.

As noted above, it is envisaged that the technical benefits provided by the collar feature can also be achieved in downhole tool deployment assemblies that do not have a mandrel or outer tubular member (i.e. a tubular heat conduction member). The second aspect of the present invention relates to an assembly with a two-part heater body system, wherein part of the heater is configured to be retrievable once the alloy has been melted.

The operation of the downhole tool deployment assembly of the second aspect of the present invention will now be described with reference to FIG. 4, which shows the key stages of the downhole tool deployment method.

As with FIG. 3, the method will be demonstrated with reference to an OHGP. Once again, an open hole 100 is formed in an underground formation so as to access an underground oil/gas reservoir.

The oil/gas is extracted from the reservoir via the production tubing 101, which in the region of the reservoir comprises a screen with a plurality of slots or apertures designed to allow the free flow of downhole fluids, including oil, into the tubing and ultimately out of the well.

In order to prevent the slots or apertures of the tubing 101 becoming blocked, a proppant 102 is provided between the tubing 101 and the surrounding formation 100.

In the first stage the assembly 200 is deployed downhole via the tubing 101 using delivery means 206. The assembly 200 comprises an up-hole tubular section 201 and a downhole tubular section 202. Both sections align to create a central cavity within which a heat source (e.g. chemical heat source) is received. The heat source has been omitted from FIG. 4 purely for the sake of clarity.

The up-hole section 201 of the assembly is so described because in use it is located closest to ground level. Similarly, the downhole section 202 of the assembly is so described because in use it is located further down hole than the up-hole section.

A point of weakness 204 is located at the point where the up-hole and downhole tubular sections of the assembly meet. Although not shown in any detail, it will be appreciated that the point of weakness may take the form of a weakened region of a single tubular body which is configure to break under a predetermined force to realise the up-hole and downhole sections of the assembly.

Alternatively, the point of weakness may comprise fixing means that hold the up-hole and downhole sections together. These fixing means, which may be in the form of a sheer pin, a shear ring or a destructible screw thread, are configures to fail when a predetermined force is applied to the assembly 200.

The point of weakness 204 is shielded by a collar 203, which is shown extending away from the lower end of the up-hole section 201 of the assembly. It is appreciated that in an alternative embodiment the collar may extend from the top end of the downhole section 202 in addition to or instead of the collar on the up-hole section.

Figure 4:
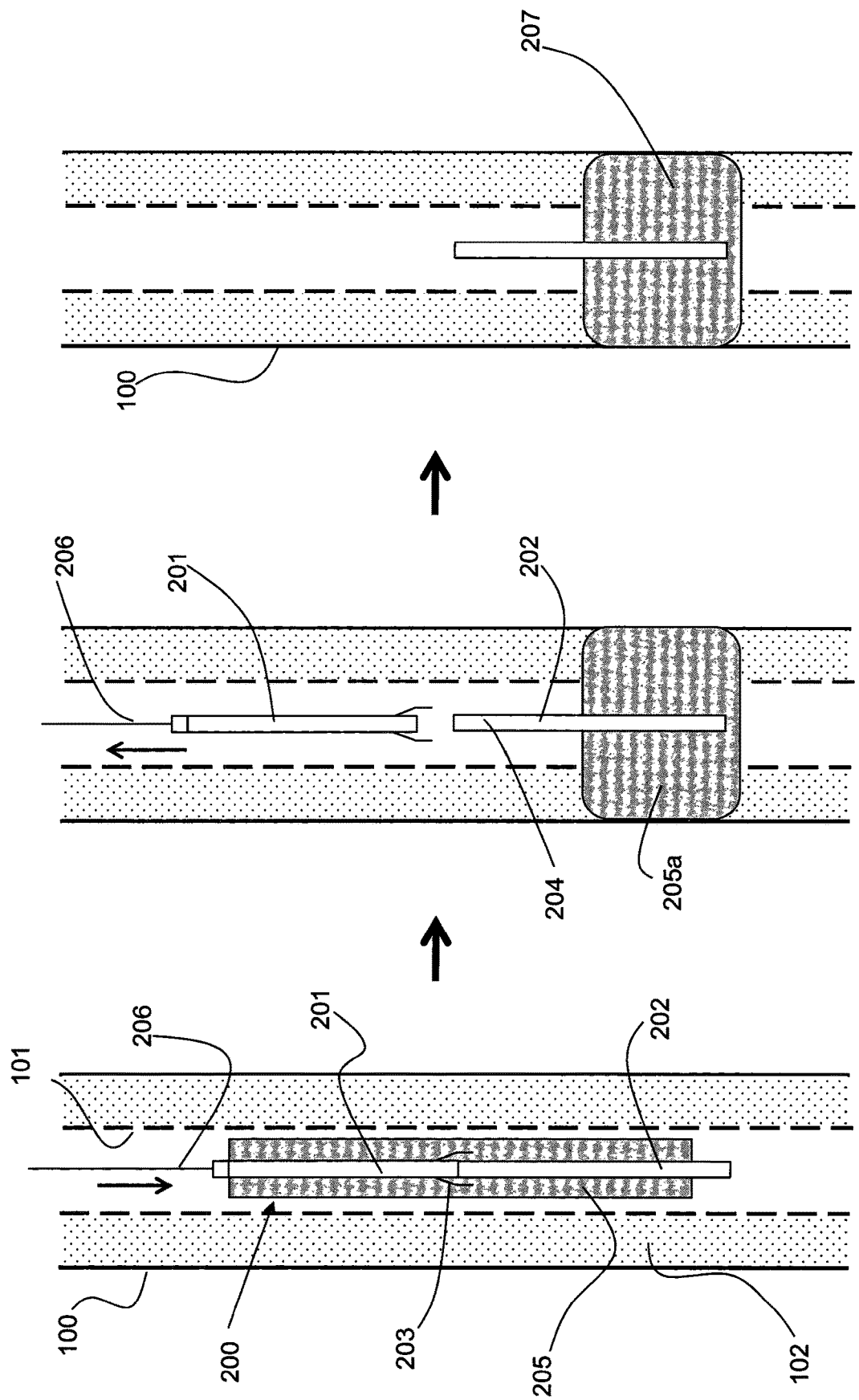
FIG. 4 provides a diagrammatic representation of the key stages of deploying a downhole tool in well tubing using the downhole tool deployment assembly of the second aspect of the present invention.

As described above with regard to the operation of the assembly of the first aspect of the present invention, the collar 203 serves to prevent molten alloy from cooling and re-solidifying over the separation point between the different sections of the assembly, which in the case of the assembly shown in FIG. 4 are the up-hole 201 and downhole sections 202.

An alloy coating 205 is provided on the outside of the assembly so as to cover the collar 203 and at least part of both the up-hole 201 and downhole 202 sections thereof. The alloy 205 is a eutectic alloy, which may be bismuth based. The alloy coating 205 serves to reinforce the connection between the up-hole and downhole sections of the assembly so that the assembly retains a monolithic structure until the alloy is melted.

As outlined above, in the first stage of the deployment process the assembly 200 is delivered downhole to a target region within the well. Once in position, the heat source is activated and the alloy 205 is melted.

As the alloy 205 melts it flows down the body of the assembly away from the up-hole section 201 and thereby reveals the up-hole section. As the alloy flows, the collar 203 serves to direct the alloy 205 away from the point of weakness and thereby prevent molten alloy flowing into direct contact with the region at which the two sections of the assembly would be separated from one another.

As the alloy 205 flows it starts to cool and re-solidify into a plug 205a. As can be seen from the second step shown in FIG. 4, the alloy can flow through the perforations into the surrounding annulus, thereby forming an alloy seal that extends across the entire cross-section of the wellbore 100.

Once the alloy plug 205a has been allowed to cool and set, the delivery means 206 can be operated in reverse to pull the assembly out of the well. The pulling force of the delivery means works again the anchoring force of the plug 205*a* to impart a force separating force that exceeds the predetermined force required to break point of weakness so that the two sections of the assembly can be separated from one another.

It will be appreciated that without the additional structural support of the alloy covering the point of weakness readily fails, thereby permitting the retrieval of the up-hole section of the assembly.

In the final stage shown in FIG. 4 the plug 205*a* is shown in situ within the well. It should be noted that the length of the downhole section has been exaggerated for the purposes of clearly demonstrating the operation of the assembly. The actual length may be considerably less so as to ensure that, if necessary, the plug can be drilled/milled out relatively quickly.

The invention claimed is:

1. A downhole tool deployment assembly, said assembly comprising:
    a heater with a tubular heater body having an internal cavity configured to receive a heat source;
    a tubular heat conducting member configured to surround the tubular heater body leaving an annular clearance between said conducting member and said heater body, wherein the tubular heat conducting member does not extend along the entire length of the tubular heater body;
    a collar mounted adjacent to the region of the assembly where the tubular heat conducting member ends, wherein the collar is configured to prevent access to the annular clearance between the tubular heat conducting member and the tubular heater body;
    an eutectic/bismuth based alloy covering extending over the collar and at least a portion of the tubular heater body and the tubular heat conducting member, and whereby only the alloy holds the heater and the tubular heat conducting member together until the alloy is melted; and
        whereby once the eutectic/bismuth based alloy has melted and slumped, the heater can be retrieved from the heat conducting member through said clearance.

2. The assembly of claim 1, wherein the collar is mounted on the tubular heater body.

3. The assembly of claim 1, wherein the collar extends from a first diameter at a first end thereof to a second, larger diameter at a second end thereof.

4. The assembly of claim 1, wherein the alloy is at least partially enclosed within an insulating sleeve.

5. The assembly of claim 4, wherein the insulating sleeve comprises one or more openings in a region adjacent to the collar.

6. The assembly of claim 4, wherein the insulating sleeve comprises one or more weakened points in the region adjacent to the collar; said weakened points being configured to fail before the rest of the remaining sleeve.

7. A method of deploying a downhole tool within an oil/gas well, said method comprising:
    delivering into a target region of an oil/gas well a tool deployment assembly according to claim 1;
    activating the heater to melt the eutectic/bismuth alloy layer;
    allowing the alloy to cool and secure the tubular heat conducting member in position within the oil/gas well to form the downhole tool;
    retrieving the heater from the oil/gas well.

8. A downhole tool deployment assembly, said assembly comprising:
    a heater with a tubular heater body having an internal cavity configured to receive a heat source, wherein the tubular heater body comprises an up-hole section and a downhole section that are separated by a point of weakness;
    a collar mounted adjacent to the point of weakness, wherein the collar is configured to cover the point of weakness; and
    a eutectic and/or bismuth based alloy covering extending over the collar and at least a portion of both the up-hole section and the downhole section of the tubular heater body, and whereby the alloy holds the up-hole and downhole sections of the tubular heater body together until the alloy is melted.

9. The assembly of claim 8, wherein the collar extends from a first diameter at a first end thereof to a second, larger diameter at a second end thereof.

10. The assembly of claim 8, wherein the alloy is at least partially enclosed within an insulating sleeve.

11. The assembly of claim 10, wherein the insulating sleeve comprises one or more openings in a region adjacent to the collar.

12. The assembly of claim 10, wherein the insulating sleeve comprises one or more weakened points in the region adjacent to the collar; said weakened points being configured to fail before the rest of the insulating sleeve.

13. A method of deploying a downhole tool within an oil/gas well, said method comprising:
    delivering into a target region of an oil/gas well a tool deployment assembly according to claim 8;
    activating the heater to melt the eutectic/bismuth alloy layer;
    allowing the alloy to cool and secure the downhole section of the tubular heating body in position within the oil/gas well to form the downhole tool;
    retrieving the up-hole section of the tubular heater body from the oil/gas well.

14. The assembly of claim 1, 2, 3 or 4, wherein the tubular heat conducting member is formed from aluminum.

15. The assembly of claim 1, 2, 3 or 4 further comprising a skirt portion located at the end of the tubular heat conducting member remote from the collar.

16. The assembly of claim 1, 2, 3 or 4 further comprising an end plate located at the end of the tubular heat conducting member remote from the collar.

17. The assembly of claim 1, 2, 3 or 4, further comprising releasable fixing means to supplement the holding together of the heater and the tubular heat conducting member until the alloy is melted.

18. The assembly of claim 1, 2, 3 or 4, wherein the internal cavity of the tubular heater body contains a chemical reaction heat source.

19. The assembly of claim 1, 2, 3 or 4, wherein the inner walls of the tubular heater body are provided with a layer of refractory material.

20. A method of deploying a by-pass conduit, such as a straddle, within an oil/gas well, said method comprising:
    deploying a downhole tool within an oil/gas well using the method of claim 7 or 13;
    providing a length of tubing with eutectic/bismuth based alloy mounted on the outer wall of said tubing;
    delivering the tubing onto the downhole tool;
    heating the tubing so as to melt said alloy; and allowing the eutectic/bismuth based alloy to cool and secure the tubing in position so as to form a by-pass conduit within the oil/gas well.

21. The method of claim 20, wherein the alloy provided on the tubing is in the form of an annular packer.

22. The method of claim 20, wherein the tubing is heated using a heater located within the tubing.

23. The method of claim 22, wherein the heater comprises a chemical heat source.

24. The method of any of claims 21 or 22, wherein the heater is retrieved once the alloy has cooled.

25. The method of claim 20 wherein the heater is retrieved once the alloy has cooled.

26. A method of sealing an oil/gas well, said method comprising:
    delivering into a target region of an oil/gas well a tool deployment assembly according to claim 1 or 8;
    activating the heater to melt the eutectic/bismuth alloy layer;
    allowing the alloy to cool and secure the downhole section of the tubular heating body in position within the oil/gas well to form a seal within the target region;
    retrieving the up-hole section of the tubular heater body from the oil/gas well.

27. The assembly of claim 8, 9, or 11, further comprising a skirt portion located at the end of the tubular heat conducting member remote from the collar.

28. The assembly of claim 8, 10, or 12, further comprising an end plate located at the end of the downhole tubular section remote from the collar.

29. The assembly of claim 8, 9, or 10, further comprising releasable fixing means to supplement the holding together of the up-hole and downhole sections of the tubular heater until the alloy is melted.

30. The assembly of claim 8, 11, or 12, wherein the internal cavity of the tubular heater body formed by the up-hole and downhole sections contains a chemical reaction heat source.

31. The assembly of claim 8, 9, or 10, wherein the inner walls of the up-hole and downhole sections of the tubular heater body are provided with a layer of refractory material.

* * * * *